Oct. 7, 1958     E. H. GROSS     2,855,039

SOUND-ABSORBENT STRUCTURE

Filed July 22, 1953

INVENTOR
EDWARD H. GROSS
BY
Jo. N. Nielsen
ATTORNEY

United States Patent Office 2,855,039
Patented Oct. 7, 1958

2,855,039
SOUND-ABSORBENT STRUCTURE

Edward H. Gross, New York, N. Y.

Application July 22, 1953, Serial No. 369,600

5 Claims. (Cl. 160—236)

This invention has for its object primarily the reduction or minimizing of the passage of sound waves through openings, such as the windows of a building, with a view to eliminating street and similar noises. It has for a further object the reduction of noise-penetration without undue interference with the admission of air and light through such openings.

For the accomplishment of the foregoing and other objects, a slatted structure or louver is adaptable, and preferably one that is adjustable, such as a Venetian blind, that has the further advantage of controlling the admission of air and light. The invention accordingly depends upon a slat construction that provides for the substantial absorption of sound waves that impinge upon it whether the slats are in a closed or in an open position for admitting light; preferably also the slat is given a conformation that promotes as well dispersion and reflection of sound and other forms of wave energy to adjacent slats.

Basically, the invention comprises a slatted structure having the individual slats thereof adjustably mounted to permit control of light and free movement of air between adjacent slats. The slats have a core of sound-absorptive material, such as bonded fibers of glass or rock wool or soft woods, like balsa wood; or a core of foamed synthetic resin such as polyethylene, polystyrene, phenol-formaldehyde resin, urea-formaldehyde resin, polyvinyl chloride resin, cellulose esters as for example cellulose acetate, and sponge rubbers. The sound-absorptive materials are preferably embodied as cores, since they usually have unsightly rough surfaces that are disagreeable to handle, and are unattractive in appearance. About the cores are provided skins or coverings which are preferably of a sound-deadening nature. Such a skin or covering can be sheet metal with perforations suitably spaced, such perforations being necessary with a metal covering, since the metal covering has of itself inadequate sound-absorptive properties.

However, since such openings, necessary with metal coverings, enable rain, dust and dirt to enter the core structure, and thereby deterimentally effect the appearance and functioning of the slats, my preferred slats have the sound-absorptive core completely encased in a pliable sheathing of preferably about 0.005 to 0.010 inch thickness of rubber sheeting or sheeting or film of thermoplastic material, such as cellulose acetate, polyethylene, rigid or plasticized polyvinyl chloride and the like. Such thermoplastic material can be formed as by extrusion to tubular shapes of the desired cross-section, and the sound-absorptive core is thereafter inserted. Alternatively, the thermoplastic material can comprise both the core and sheathing of the slat by incorporating conventional blowing or foaming agents in the plastic, and extruding such mixtures at temperatures activating the blowing agent and under conditions forming a continuous outer skin of the plastic united to an interior core of foamed or cellular plastic. Surprisingly, a continuous skin or sheathing of plastic or rubber material completely surrounding a core of fibrous or foamed plastic sound-absorptive material is highly effective in accomplising sound-absorption, and the absence of perforations not only provides a slat of attractive appearance, but whose exterior surfaces can be readily cleaned when needed, and the interior core is effectively isolated from dirt and rain. Further improvement is attained when the plastic skin or covering is separated as by spacers from the core to form air pockets.

The shape or conformation given the slats also contributes to the end sought. Efficiency of sound absorption increases with the thickness of the core material; but slats of rectangular cross-section, which this suggests, are not prepossessing in appearance. Slats of an elliptical, streamline, or tear drop cross-section, having a minor axis comparable to the selected thickness, are substantially of the same sound-absorbing efficiency as slats of rectangular cross-section; moreover, they have the added advantage over slats of rectangular cross-section of causing sound-dispersion and partial reflection to a wider surface area of adjacent slats and thereby further minimize the passage of sound.

A particular advantage of slats having a core of sound-absorptive material is that with an assembly of such slats tiltably mounted and spaced apart with fabric or like supporting strips as in a conventional Venetian blind structure, a substantial absorption of sound is had even when the slats are adjusted to a horizontal position to provide for maximum admission of light.

The invention is thus capable of various embodiments, some being illustrated in the accompanying drawing in which Fig. 1 is a plan view of a slat having an elliptical cross-section;

Figure 1:
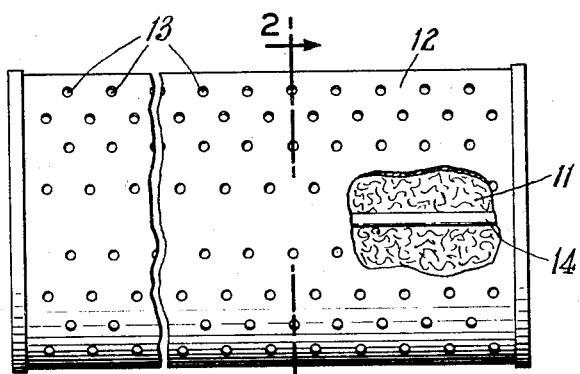
Figure 2:
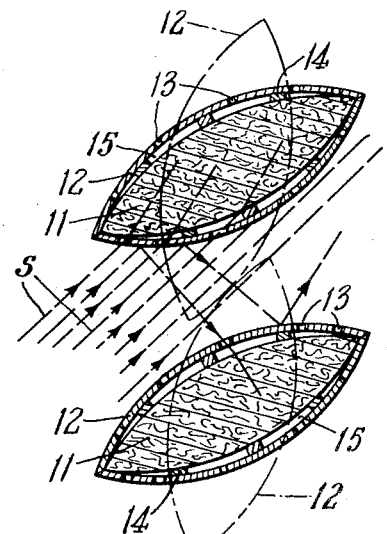
Fig. 2 is a cross-section on the line 2—2 of Fig. 1, shown in open assembly with an adjacent slat.

The slat embodiment of Figs. 1 and 2 consists of a sound-absorptive core 11 that is of elliptical cross-section; in Fig. 2 two adjacent slats of a Venetian blind assembly are shown in a partly open position by full lines permitting passage of light between adjacent slats and in closed position by dotted lines. The cross-section provides a substantial depth of sound-absorptive material for sound refraction and absorption irrespective of the direction of an incoming sound wave band, indicated by line S, and also provides a scattering or dispersion as well as interference to deaden the total sound effect that passes through. Materials like bonded fiber-glass, wood fibers, etc. in about ½ inch thickness have a noise-reduction coefficient of around .60 to .65, and elliptical contours having minor axes of ⅜ to ⅝ inch make slats that are satisfactory from the standpoints of use and operation.

As shown in Figs. 1 and 2 the core of sound-absorptive material is encased in a metal shell 12 with perforations 13; as manufactured, these perforations are about 0.10 to 0.25 inch in diameter and spaced about 0.4 to 0.6 inch on center, and a high noise-reduction (.70–.80) coefficient is obtainable with this spacing. Further improvement in the cofficient is secured by the provision of spacers 14 that separate the shell from the core to form air pockets 15. As a result a Venetian blind with slats of this structure can reduce the volume of sound passing through to about one-half and even more, depending on the opening between them; this is illustrated by the sound waves S in Fig. 2, some entering perforations to be absorbed while others are reflected for absorption or re-reflection by the adjacent slat.

Figure 3:
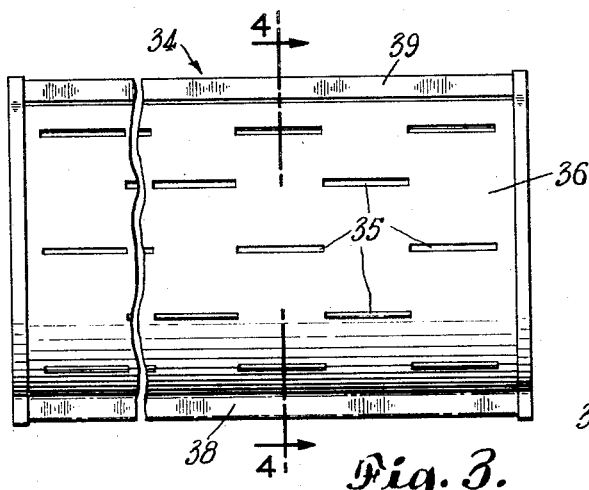
Fig. 3 is a plan view of a modification of Fig. 1.
Figure 4:
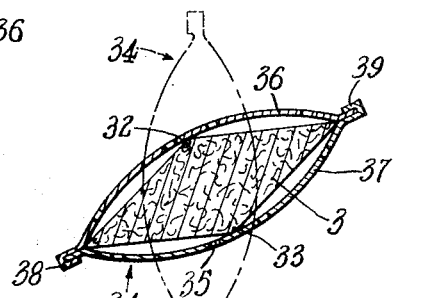
Fig. 4 is a cross-section on the line 4—4 of Fig. 3, shown in closed assembly with a portion of an adjacent slat.

The modification illustrated in Figs. 3 and 4 is a simplification of the preceding in that the sound-absorptive core 3 is given a diamond cross-section; such a core can be cut from a sheet or board of the material without further working, and the metal sheet halves are crimped together at the edges. The corners 32, 33 of the core provide the spacers to separate the elliptical metal shell 34 from the core. As a further modification the shell is shown with slots 35 instead of round perforations. The shell can be made of two parts 36, 37, one part being crimped at the edges 38, 39 about the other. These crimped edges further serve as stops, as Fig. 4 shows, to contact with the edges of an adjacent slat and thus form a tight closure.

Figure 5:
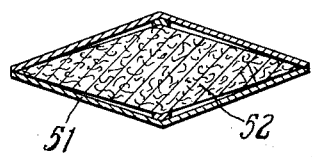
Figs. 5, 6 and 7 are cross-sections of other modifications of Fig. 1.

The modification of Fig. 5 is similar to that of Fig. 3 with the exception that a perforated diamond-shaped metal shell 51 about the similarly shaped core 52 is provided. The outer surfaces of the slat are thus flat, reflecting and absorbent surfaces.

Figure 6:

In Fig. 6 is illustrated a core 71 of sound-absorbent material preferably supported by an embedded sheet 72 of perforated metal when the core is not sufficiently self-supporting. In place of a metal shell, the core is completely enclosed with a sheeting or coating 73 of flexible or semi-flexible material, such as metal foil, but preferably a synthetic plastic film; the foil or film can be mounted on a supporting medium, such as cloth or paper. With a coating of this nature the sound wave is in part transmitted to the core to be there absorbed.

Figure 7:
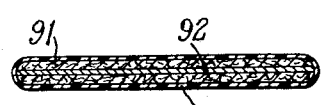

Fig. 7 illustrates a slat of normal flat construction having a core 91 which can be supported by a plate 92, and a flexible metal foil or plastic film coating 93.

This application is a continuation-in-part of my application, Serial No. 39,096, filed July 16, 1948, now abandoned.

What is claimed is:

1. Sound-absorptive louver slat comprising a core of pliable foamed thermoplastic material having a minor axis thickness of at least about ⅜-inch and a continuous non-perforated covering of pliable thermoplastic material encasing said core.

2. Sound-absorptive louver slat according to claim 1 having a core of foamed polyethylene.

3. Sound-absorptive louver slat according to claim 1 having a core of foamed polyvinyl chloride.

4. Sound-absorptive louver slat according to claim 1 having a core and a non-perforated covering of polyethylene.

5. Sound-absorptive louver slat according to claim 1 having a core and a non-perforated covering of polyvinyl chloride.

References Cited in the file of this patent

UNITED STATES PATENTS

| | | |
|---|---|---|
| 2,160,638 | Bedell et al. | May 30, 1939 |
| 2,217,217 | Engstrom | Oct. 8, 1940 |
| 2,227,238 | Warren | Dec. 31, 1940 |
| 2,229,225 | Schneider | Jan. 21, 1941 |
| 2,230,707 | Wallace | Feb. 4, 1941 |
| 2,325,003 | Beckwith | July 20, 1943 |
| 2,341,233 | Norton | Feb. 8, 1944 |